United States Patent

[11] 3,562,396

[72] Inventor Richard H. Peterson
11748 Walnut Ridge Drive, Palos Park, Ill. 60464
[21] Appl. No. 844,383
[22] Filed July 24, 1969
[45] Patented Feb. 9, 1971

[54] ELECTRONIC GATING AND COMPONENT ASSEMBLY FOR ELECTRONIC MUSICAL INSTRUMENT
10 Claims, 6 Drawing Figs.

[52] U.S. Cl. .................... 84/1.01, 84/1.14, 84/1.17
[51] Int. Cl. .................... G10h 1/00
[50] Field of Search .................... 84/1.01, 1.14, 1.17, (C,E,K,O)

[56] References Cited

UNITED STATES PATENTS 2,495,339 1/1950 Markowitz .................. 84/1.01
2,895,366 7/1959 Schneeberger et al. .................. 84/1
2,962,922 12/1960 Cutler et al. .................. 84/1.01
3,197,541 7/1965 Peterson .................. 84/1.14
3,482,480 12/1969 Decker .................. 84/470

*Primary Examiner*—W. E. Ray
*Attorney*—Donald H. Sweet

ABSTRACT: Many hundreds of electronic components, including semiconductors and resistors, that comprise the electronic gating and switching circuitry for an electronic organ, are assembled in a compact geometrical space, and arranged to minimize problems of electrostatic coupling between input and output conductors. All components are wired using wire with solder-through insulation. The wiring is routed in channels in a manner permitting dip soldering of all components and cable connections. Several hundred connections are soldered in each dipping operation.

INVENTOR

Richard H. Peterson

INVENTOR

Richard H. Peterson

ELECTRONIC GATING AND COMPONENT ASSEMBLY FOR ELECTRONIC MUSICAL INSTRUMENT

SUMMARY OF THE INVENTION

The prior art is quite well exemplified in my earlier U.S. Pat. Nos. 3,027,418 for "Electrically Interconnected Network" issued 27, Mar. 1962; 3,197,541 for "Electronic Musical Instruments" issued 27, Jul. 1965; and 3,320,489 for "Electrical Wiring" issued 16, May 1967. The present invention extends the scope of these earlier inventions. The electronic gating and switching circuits for even a small electronic organ may involve as many as several thousand semiconductor and other components interconnected by wiring between the playing keys and the 73 or more oscillators that typically comprise such an instrument. The complexity of the wiring is thus similar to that employed in a fair size telephone switchboard. In addition, it is difficult to achieve the necessary interconnections without achieving undesireable effects due to capacitive coupling between the many input conductors and the output conductors. This invention provides a compact method of supporting and interconnecting the required components whereby the undesirable effects are eliminated, and which is readily adaptable to mass production methods.

In a typical embodiment six primary supports of circuit board material about 2 inches high and 8 inches long are set side by side. Each individual support has 61 gating circuits extending across the support with all the electrical components, such as resistors and diodes, lying against one face of the support and the terminals of the components projecting through the support to the other side, where a single dip soldering operation can interconnect all the related terminals to complete the gating circuits. In the embodiment illustrated each dip soldering of a primary support completes some 244 soldered electrical junctions between the various resistors and diodes and buses. The complete unit illustrated employs six such primary supports for a total of 1,354 electrically soldered joints completed in six dip soldering operations. Subsequently the supports are positioned on a secondary base support and the homologous gating circuits on each of the six primary supports are connected together by conductors on the lower face of the base support, with the terminals of the gating circuits projecting through openings in the base support.

The upper end terminals of each gating circuit project above the remote upper edge of the primary support and are held in place by an extruded top channel. The conductors to the keying circuits have their ends wrapped around the upper end terminals of the gating circuits. From this union each conductor is led down through a notch and then longitudinally inside a channel, which projects the cable thus formed, during a subsequent dip soldering operation which simultaneously solders all of the upper end terminals. Tone frequency signals are fed to the individual gate circuits through their lower terminals which are connected to parallel conductors on the secondary support, which conductors are all in a common plane, and which are thus arranged for minimum electrostatic coupling one to the other. Interposed in each of these conductors near the edge of the secondary support is an additional "Common" gating circuit, which prevents signals from appearing on the parallel conductors under the primary supports, except when related keying circuits are operated. A connector connects to the tone generator and "Plugs On" to the secondary support, thus making contact with the parallel conductors.

In the accompanying drawings.

Figures 1, 2:
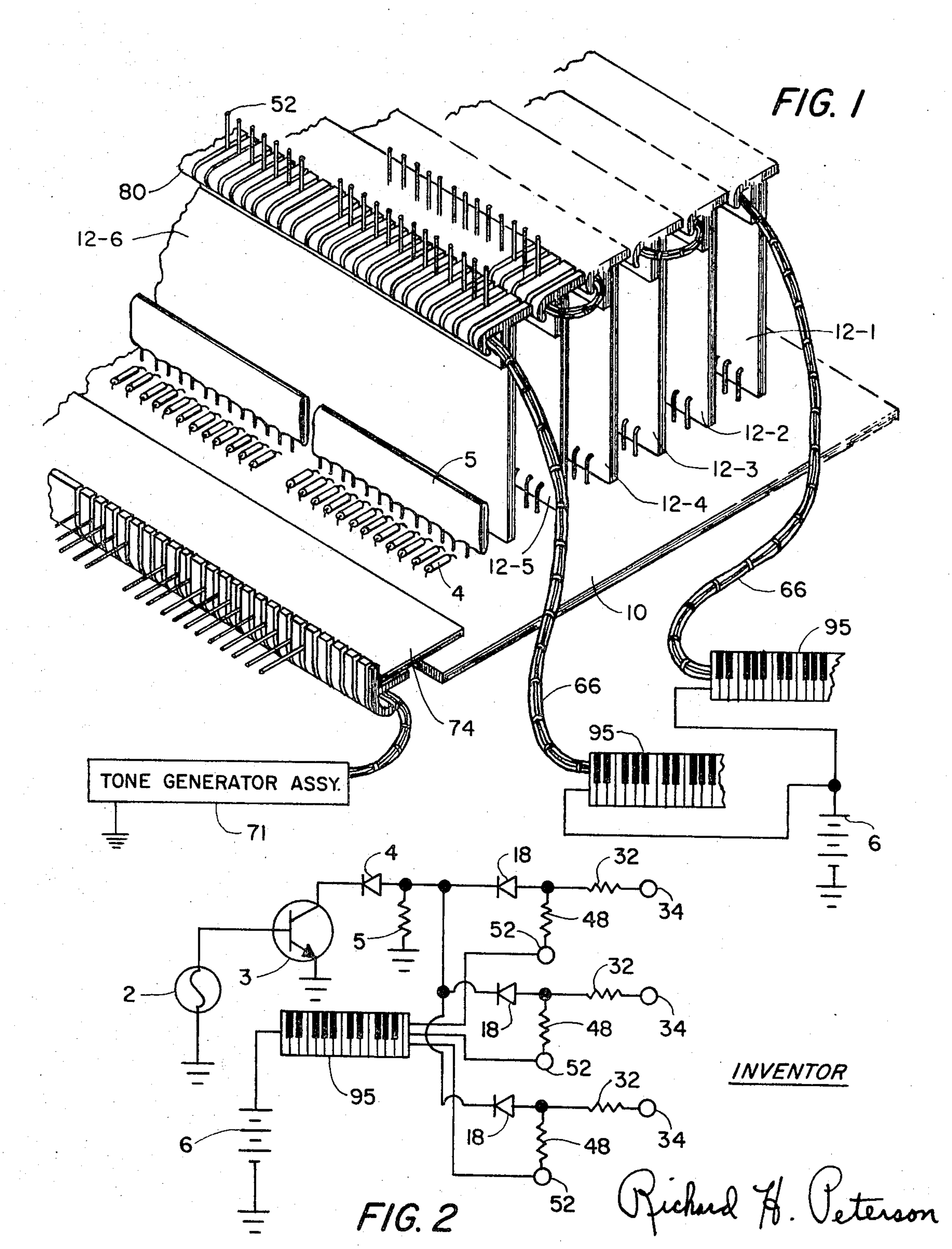
FIG. 1 is a partly diagrammatic perspective on a small scale of the unit according to the invention.
FIG. 2 is a schematic circuit diagram of a gating circuit.

In the embodiment of the invention selected for illustration and referring first to FIG. 2, the signal source 2 and the switching transistor 3 represent a tone generator for one note of an electronic organ. The complete tone generator represented by the block 71 in FIG. 1 comprises a large number of individual note generators. The diode 4 and resistor 5 comprise a common gate which prevents signals from the generator 2 from appearing on the conductor 14 unless one of the terminals 52 is energized by one of the keying circuits. A plurality of individual gating circuits including diodes 18 and resistors 32 and 48 are shown associated with each common gating circuit. Each of these gating circuits is identical, and accordingly has its components identified by the same reference characters. It should be understood however, that each of the individual gates shown associated with tone source 2, is mounted on a different one of the primary support circuit boards 12–1 through 12–6. All of the gates mounted on primary support 12–1 for example, might be associated with the 16 foot stops of the organ, while the gates on primary support 12–2 might be associated with the 8 foot stops, etc.

When a DC potential from source 6 is applied to a terminal 52 through the keyboard and keyswitch assembly 95, and when transistor 3 is not conducting, a DC potential appears on the output terminal 34. If however, the transistor 3 is switched at a signal frequency rate between conducting and nonconducting states by the signal source 2, the voltage at the junction of resistors 48 and 32 will be periodically clamped to ground through diodes 18 and 4 and conducting transistor 3; and a square wave signal appears at output terminal 34. Referring now to FIG. 1, the rectangular secondary base support 10 is a sheet of phenolic or other circuit board material, and it supports six primary supports 12–1, 12–2, 12–3, 12–4, 12–5 and 12–6.

Figures 3, 4, 5:
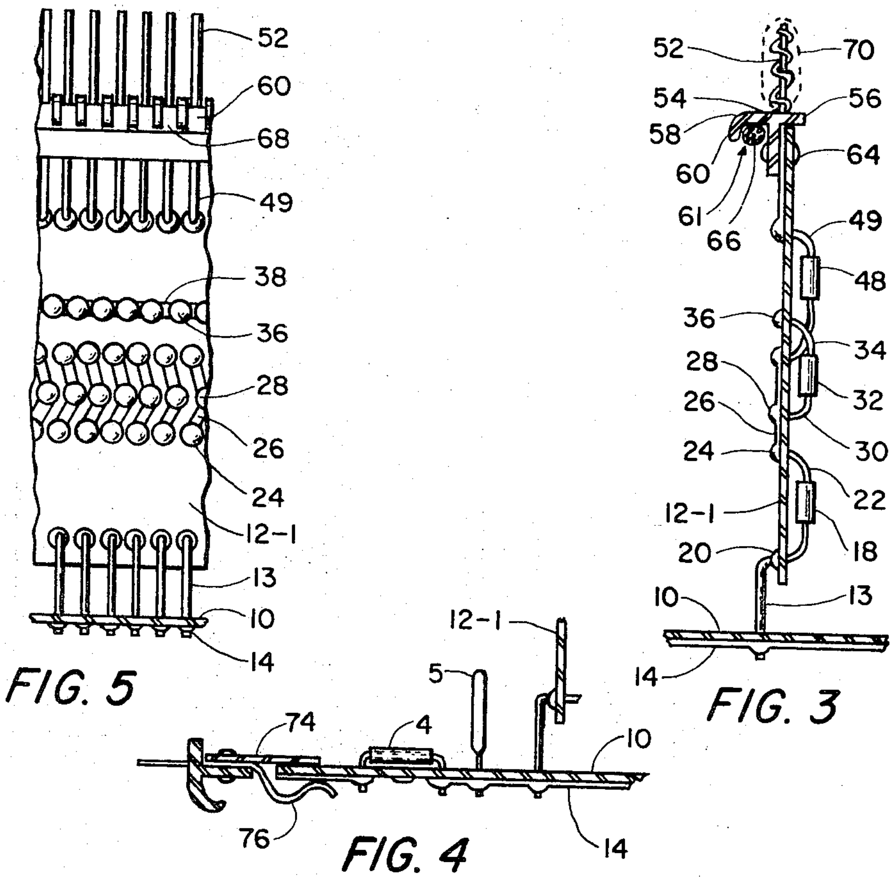
FIG. 3 is a vertical section on a transverse plane of one primary support.
FIG. 4 is a detail section on line 4—4 of FIG. 1.
FIG. 5 is a partial side view of the support of FIG. 3.
Figure 6:
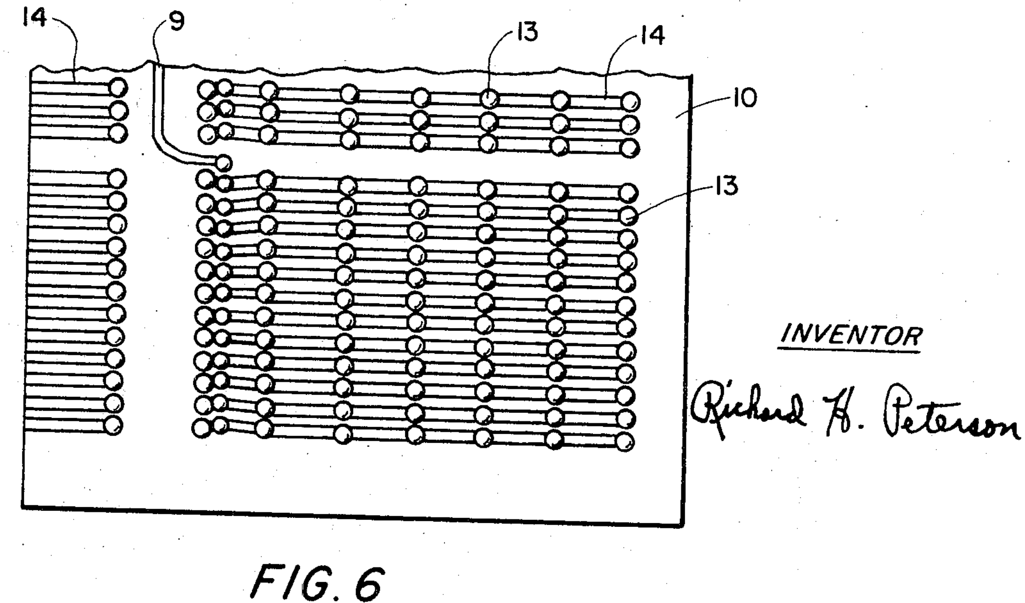
FIG. 6 is a fragmented bottom view of the assembly of FIG. 1.

As best indicated in FIGS. 3, 5 and 6 each gating circuit extends upward from a conductor 14 on the lower face of the base support 10. The terminal 13 is turned at right angles and passes through the support 12–1 to enter the end of a diode 18 and a small solder gob 20 improves the mechanical contact between the support 12–1 and the terminal. From the diode 18 the upper diode terminal 22 passes through the support 12–1 and ends in a pad 24. A printed conductor 26 extends upwardly and slightly to one side to a pad 28 which makes electrical contact with the lower terminal 30 of a resistor 32. The resistor 32 has an upper terminal 34 passing through the support and entering a pad 36 which is part of a horizontal bus which unites the pads 36, as best indicated in FIG. 3. Finally the upper terminal 49 of resistor 48 passes again through the support 12–1 and then up along the face of that support and beyond to provide a terminal post 52.

The channel top 54 has one serrated flange 56 extending across the upper edge of the support 12–1 and a much wider flange 58 extending horizontally and then curved down at 60 to define a receiving channel. The stem 62 completes the structure of the channel top and this stem is riveted at intervals by rivets 64 extending through the support 12–1 but not forming part of any electrical circuit. In the channel defined by the flange 58 I have indicated a cable 66 comprising a multiplicity of very fine conductors which are led along the channel and then turned up at intervals to lie in the slots 68 best illustrated in FIG. 3. Above these slots the conductor is wound two or three times around the upper terminal post 52 of the gating circuit.

These very fine conductors may be positioned in their predetermined arrangement with a simple hand tool, as illustrated in FIG. 13 of U.S. Pat. No. 3,027,418. The wire has an insulating coating of nylon enamel, or other solder-through insulation.

Subsequently the entire structure indicated in FIG. 1 is turned upside down from the position shown in that figure and dipped in molten solder to pick up a large gob 70 indicated in FIG. 3, in which gob the twisted wire end and the terminal post 52 are completely and firmly embedded.

Referring now to FIG. 1 the cable 66 is shown schematically connected to the keyboard assemblies 95, through which energizing potential is delivered from the source of potential 6 to the individual gating terminals 52.

The tone generator assembly 71 is wired to a connector 74 which may be made and wired according to my U.S. Pat. No. 3,320,489 previously referred to. As shown in FIG. 4, the contact clips 76 engage the parallel conductors 14 at the edge of the primary support 10. As shown in FIGS. 4 and 6, a common diode 4 (also see FIG. 2) is interposed in each conductor 14, and a resistor 5 is connected from each conductor 14 to ground. These resistors are preferably thin film resistors packaged in groups of 12 and mounted as shown in FIG. 4. The ground leads from these resistors connect to the conductor 9 which is connected to ground.

Although the embodiment of the invention illustrated shows a particular gating circuit, it is obvious that some of the features of the invention are applicable to other gating circuits or to similar electronic switching circuits that may control either AC or DC voltages. Others may readily adapt the invention to use under various conditions by employing one or more of the novel features involved.

I claim:

1. A switching or gating network for an electronic musical instrument comprising, in combination:
- a plurality of primary supports of nonconductive material set side by side in a compact geometrical space;
- said space having two, first and second major faces facing away in different directions;
- a secondary, or base support of nonconductive material occupying one of said major faces;
- each primary support having one, proximate first edge adjacent said base support;
- each proximate primary support edge being mechanically connected to said base support;
- each primary support having a second, remote edge, remote from said secondary support;
- the remote edges of said primary supports lying adjacent said second major face of said compact geometrical space;
- a multiplicity of cross circuits arranged side by side along each primary support;
- each cross circuit having a first terminal adjacent said secondary base support and a second terminal post;
- each remote primary support edge having a channel along its length;
- said channel opening back toward said proximate edge;
- said second terminal posts extending beyond said remote support edge and said channel; and
- a multiplicity of insulated conductors, each having one end affixed to a preselected second terminal post and extending around into said channel and then longitudinally along out one end of said channel.

2. Equipment according to claim 1 in which:
- each primary cross circuit input terminal extends to and through said secondary support;
- and a multiplicity of secondary cross conductors on the lower side of said second, base support electrically connected to said first terminals of said primary cross circuits; and
- said secondary cross conductors being electrically united to the first terminals of selected homologous primary cross circuits of a plurality of different primary supports.

3. Equipment according to claim 2 and including a plurality of diodes, said diodes interposed respectively in the said multiplicity of secondary cross conductors.

4. Equipment according to claim 2 in which:
- said terminal posts extend up above the major face of said compact space; and
- a multiplicity of keying conductors, each having one end soldered to a preselected terminal post and extending from said post to an extraneous control instrumentality.

5. Equipment according to claim 4 in which:
- each said keying conductor is led down into the channel of its primary support;
- said channel having one leg transversely slotted in from its outer edge; and
- said slots receiving and guiding the keying conductor into the channel.

6. Equipment according to claim 5 in which all said keying conductors are mechanically bound together into a multiple cable lying in the channels of said primary supports.

7. Equipment according to claim 6 in which:
- said cable enters at one end of the channel of a first primary support adjacent one face of said compact space;
- said cable extending in serpentine configuration through its first channel then through a bight of 180° to enter the channel of a second adjacent primary support; and
- then along the length of said secondary support, and into a second bight of 180° to enter the channel of a third primary support, and so on to a dead end at the remote corner of said compact space, remote from the entry of the cable into said compact space.

8. Equipment according to claim 7 in which said cable bights are formed with enough slack to permit a limited separation of adjacent primary supports, for access to the components and the circuits on the faces of said primary supports.

9. Equipment according to claim 8 in which:
- said channels are separate strips of T-shaped cross section;
- the stem of the T being affixed to the remote edge of its primary support;
- one first arm of the T curving down at its outer edge to function as the third leg of said inwardly opening channel; and
- both arms of said T, except the stem, having open ended transverse slots along their outer edges to receive and guide said terminal posts and keying conductors into their predetermined positions.

10. Equipment according to claim 9 in which the tip of each terminal post, and the conductor affixed thereto, are embedded in a solid gob of solder.